United States Patent
Leverenz et al.

[11] 3,710,811
[45] Jan. 16, 1973

[54] METHOD AND APPARATUS FOR CONTROLLING THE SALINITY OF A SOLUTION

[75] Inventors: Melvin E. Leverenz; Kenneth H. Leverenz, both of St. Clair, Mich.

[73] Assignee: Diamond Crystal Salt Company, St. Clair, Mich.

[22] Filed: June 2, 1970

[21] Appl. No.: 42,836

[30] Foreign Application Priority Data

July 14, 1970 Canada....................846,979

[52] U.S. Cl............................137/5, 137/88, 23/270
[51] Int. Cl.........................G05d 11/08, G05d 11/13
[58] Field of Search..........137/5, 87, 88, 93; 23/253, 23/312 AH, 270; 73/53

[56] References Cited

UNITED STATES PATENTS

| | | |
|---|---|---|
| 3,404,963 | 10/1968 | Fritsche....................137/88 |
| 3,195,551 | 7/1965 | Russell....................137/93 |
| 3,532,102 | 1/1971 | Giassey....................137/93 |
| 3,273,580 | 9/1966 | Ladd....................137/93 |
| 3,062,228 | 11/1962 | Heath....................137/268 |
| 3,554,212 | 1/1971 | Maroney....................137/93 |

Primary Examiner—M. Cary Nelson
Assistant Examiner—William H. Wright
Attorney—Harness, Dickey & Pierce

[57] ABSTRACT

A method and apparatus for establishing and maintaining a preselected salinity of a solution, for example, a solution used to preserve cucumbers or other produce, having a recirculation loop including a detector for measuring salinity at one point in the recirculation loop, a salt dissolver supplying high-salinity solution introducable to the recirculation loop only upstream of the detector, and a control system responsive to salinity measured by the detector to control the introduction of high-salinity solution such that the measured salinity at the detector never exceeds the desired level. The salt dissolver may be replaced by a fresh water supply to provide a system for lowering salinity levels.

13 Claims, 5 Drawing Figures

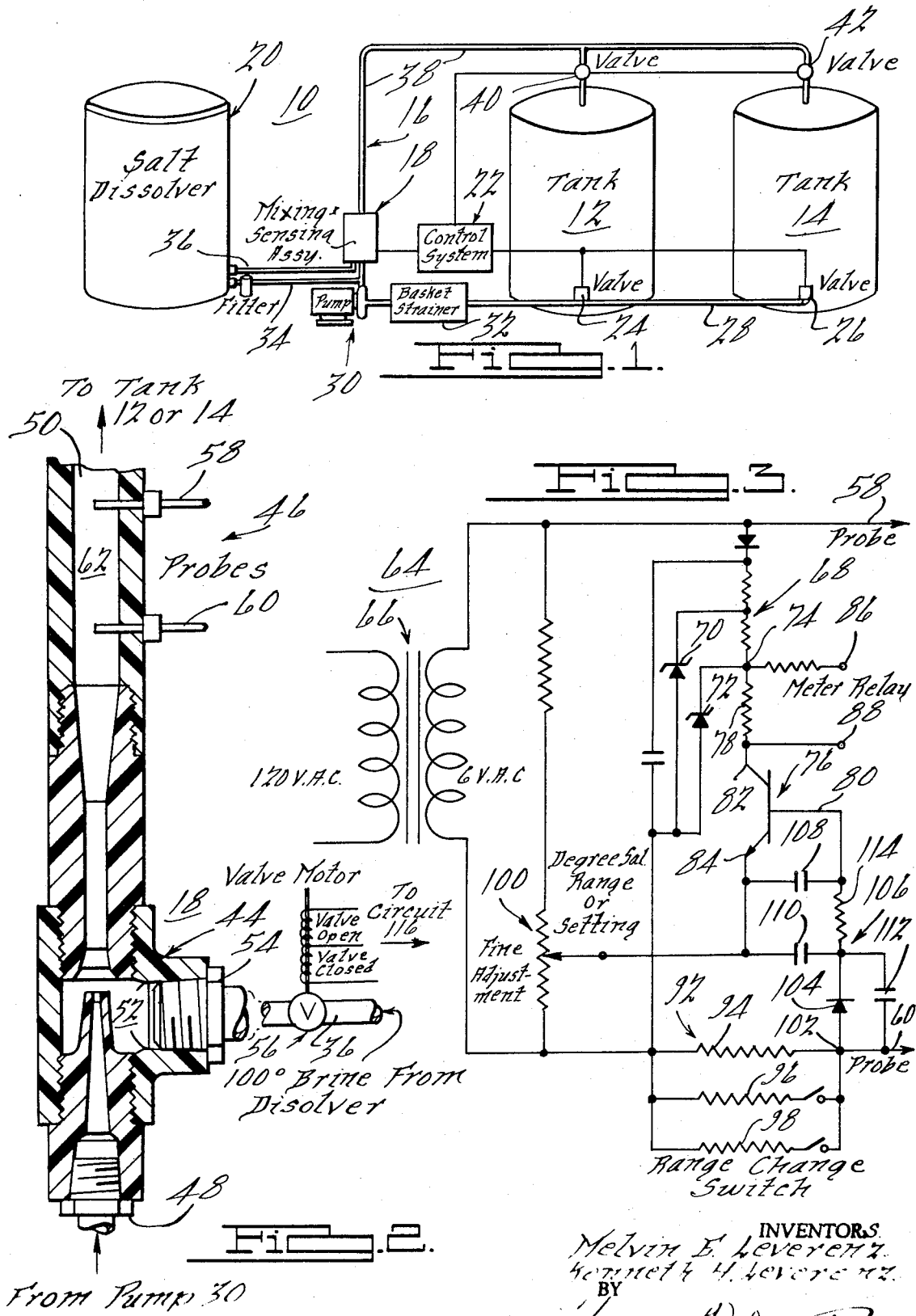

METHOD AND APPARATUS FOR CONTROLLING THE SALINITY OF A SOLUTION

BACKGROUND OF THE INVENTION

1. Field of the Invention

Methods and apparatus for controlling the concentration of a solute in a solvent, and more particularly, methods and apparatus for controlling the salinity of a solution.

2. Description of the Prior Art

Cucumbers and other produce are often preserved for a later processing in a tank containing a salt solution. Generally, the salinity of the solution is maintained at a high level during the preservation period of the produce to avoid the formation of detrimental bacteria, and immediately prior to the removal of the produce for processing, the salinity is reduced to a much lower level suitable for consumption. As will be appreciated by those skilled in this art, there is no fixed relationship as to the amount of salt required to raise the salinity of the solution in the storage tank to a desired level since the salt-absorbtivity of the produce varies as a function of the age of the produce, the type, the temperature of the solution, the length of time of immersion, and many other factors. Accordingly, the salinity of the solution must be periodically checked and salt added on a trail and error basis. This process is time consuming, and moreover, is difficult to practice with high accuracy. The accuracy of this method is further impaired due to stratification of the solution within the tank which renders the salinity reading approximate at best. It is also possible to add too much salt so as to increase the salinity level above the desired amount. In this event, correction can only be obtained by draining and disposing of some of the solution from the tank and adding fresh water. In view of the above factors which unpredictably influence the salinity of a solution used to preserve produce, a suitable automatic control system has not been made available.

STATE OF THE PRIOR ART REFERENCES

Prior art references known to the applicants and which resulted from a preliminary search are as follows: U.S. Pat. Nos. 790,482; 1,789,386; 2,065,962; 2,748,790; 2,871,695; 3,074,277; and 3,368,389.

SUMMARY OF THE INVENTION

The present invention provides a method and apparatus for automatically adjusting the level of a solute in a solvent, and more particularly, a method for establishing and maintaining a desired salinity of a solution, for example, for storage and preservation of produce. More specifically, the present invention provides a recirculation system for a tank or other container for the solution which includes a concentration or salinity detector and a system for introducing a solution into the recirculation system only upstream of the detector which differs in concentration level in the opposite sense as the container solution, i.e., higher if the concentration of the solution is to be increased or lower if the concentration is to be lowered. Accordingly, a closed loop control system is formed to assure that the concentration of the solution in the recirculation system does not pass the desired level, and consequently, the concentration of the solution in the storage tank will not pass the desired level. Preferably, the solution in the container is recirculated for a predetermined time prior to addition of the concentrate to eliminate any stratification of the solution within the container thereby assuring accurate measurement and control of solute concentration. Also, preferably, the salinity measured and the addition of concentrate (or fresh water) occurs over a long period so as to gradually approach the desired level.

As stated above, the fully closed-loop control system of the present invention avoids the possibility of increasing the concentration of the solute beyond the desired level. If the recirculation system was not a closed-loop system, for example, if all or a portion of the concentrate were added directly to the tank or upstream of the detector, it would be possible to increase the concentration over the desired level, since, as previously stated, no fixed relationship exists between the amount of salt added and the increase in salinity in the case of produce since the salt absorptivity of the produce depends upon many factors which are difficult to measure and control. Once the desired level has been exceeded, it is not possible, without waste, to decrease the salinity.

BRIEF DESCRIPTION OF THE DRAWINGS

FIG. 1 is an illustration of an exemplary control system according to this invention for automatically controlling the salinity of solution in a pair of produce storage tanks;

FIG. 2 is an illustration of the mixing valve and sensor arrangement used with the control system of FIG. 1;

FIG. 3 is a circuit diagram of a portion of the control system of FIG. 1;

DETAILED DESCRIPTION OF THE PREFERRED EMBODIMENT

Figure 4:
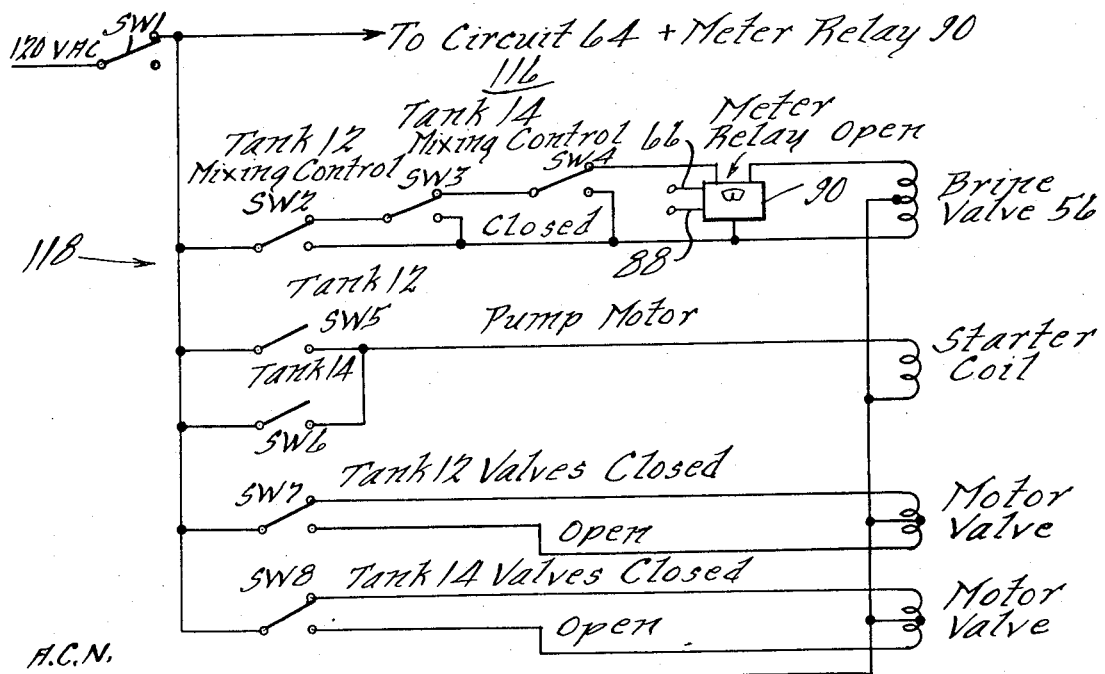
FIG. 4 is a circuit diagram of the switching circuits of the control system of FIG. 1.

In FIG. 1, an exemplary system 10 is shown for establishing and maintaining the salinity of a solution in tanks 12 and 14. For example, the tanks 12 and 14 may be used to store cucumbers or other produce for later processing. The system 10 includes a recirculation loop or system 16, a mixing and sensor section 18, a source 20 of high salinity solution, preferably about 100 percent salinity, and a control system 22.

The recirculation system 16 includes a pair of outlet valves 24 and 26 for storage tanks 12 and 14, respectively, which preferably are motorized ball-type valves. The outlet valves 24 and 26, when open, communicate the respective tanks 12 or 14 with an outlet line 28 which is connected to a centrifugal pump 30 through a basket strainer 32. The basket strainer 32 is used to remove solid particles of significant size from the fluid in outlet line 28. The outlet of the pump 30 is communicated to both an inlet line 34 for the concentrate tank and the mixing and sensor section 18. The mixing and sensor section 18 also receives high concentrate solution from a concentrate tank outlet line 36 and delivers the fluid from the pump 30 and selected portions of the high concentrate fluid from the concentrate outlet line 36 to a tank return line 38. The tank return line 38 is communicated with the storage tanks 12 and 14 through valves 40 and 42, respectively, which preferably are also motorized ball-type valves. The valves 24, 26, 40, and 42 are each controlled by the control system 22 for sequentially recirculating the solutions in tanks 12 and 14. For this purpose, control lines are provided as illustrated.

The concentrate tank 20 may be a salt dissolver, which, according to known practice in the art, contains a salt bed across which water is circulated to raise the salinity thereof to substantially 100 percent of saturation. The line 34 provides fluid from the pump 30 to the dissolver tank 20 in accordance with the depletion of fluid from the tank 20 through the line 36 so as to maintain the level of solution in dissolver tank 20 substantially constant. This may be accomplished by providing a pressure-operated or float-operated valve at the junction between the line 34 and the tank 20. This feature provides a completely closed system, i.e., there need be no spillage of saline solution from the system since solution is added to the dissolver tank 20 at the same rate as concentrate is withdrawn, and also, solution is added to the storage tanks 12 and 14 at the same rate it is withdrawn. Accordingly, pollution is avoided.

According to one contemplated use of this invention, the salinity of the solution within the tanks 12 and 14 is lowered to a desired level, for example, for processing of the produce after storage. In that use, the source of concentrate 20 will be replaced by a source of solution at lower concentration levels, and preferably, a source of fresh water. In essence, the solution to be added at the mixing and sensor section 18 must differ in solute concentration from the desired level in the opposite sense as the solution in the tank being recirculated differs from the desired level, i.e., the solution must be of higher concentration if the concentration of the recirculating solution is to be increased and of lower concentration if the concentration of the recirculating solution is to be decreased.

In FIG. 2, the mixing and sensor section 18 is illustrated in detail. The section 18 includes a hydraulic ejector portion 44 and a probe portion 46. Solution from the pump 30 enters an inlet 48 and is discharged through an outlet 50 into the tank return line 38. Flow through the hydraulic ejector 44 reduces the pressure in chamber 52 which draws fluid from the side inlet 54. The side inlet 54 is connected to the outlet line 36 of the concentrate source 20 through a motorized proportioning valve 56. Accordingly, the opening of valve 56 controls the introduction of high concentrate solution from the source 20 into the recirculation loop for deliver to the tank being processed. The hydraulic ejector 44 accomplishes efficient mixing of the concentrated solution with the solution from the tank such that the probe section 46 receives a well-mixed solution. The probe section 46 comprises a pair of conducting probes 58 and 60 used to measure the conductivity of the mixed solution in the passage 62 therebetween. The hydraulic ejector is constructed preferably of a plastic material which alleviates the need for insulators for the probes 58 and 60 and resists corrosion by any of the acids from the produce.

In view of the foregoing description of the mixing and sensing assembly, it can be appreciated that all of the concentrated solution is introduced to the recirculation loop 16 upstream of the probe section 46 such that the salinity measured by the probe section 46 reflects the concentrate added to the solution. Accordingly, a closed-loop control within the recirculation system 16 is provided.

In FIGS. 3 and 4, circuit diagrams of the control system 22 are illustrated. With reference now to FIG. 3, a circuit 64 is shown for measuring the conductivity of fluid in passage 62 between the probes 58 and 60 and for providing an output signal to control the opening of the valve 56 so as to meter the introduction of concentrated solution into the recirculation loop 16. The circuit 64 has a step-down transformer 66 receiving 120 volts AC at its primary winding and providing 6 volts AC at its secondary winding which is delivered to a two stage voltage regulator 68, each stage having a zener diode 70 or 72, providing a regulated DC potential at terminal 74. The DC voltage at terminal 74 is delivered to the collector of a transistor 76 through a load resistor 78. As can be seen in FIG. 3, the transistor 76 is connected in common-emitter configuration so as to be responsive to potential changes at its base terminal 80 to provide a corresponding current flow between its collector terminal 82 and its emitter terminal 84. The current flow from the collector terminal 82 to the emitter terminal 84 provides a voltage drop across the load resistor 78, appearing across output terminals 86 and 88, which varies in accordance therewith. The terminals 86 and 88 are connected to a meter relay 90 (FIG. 4). The potential at base terminal 80 varies in accordance with the salinity of the solution in passageway 62 in a manner to be explained hereinafter.

The circuit 64 also includes means 92 for changing the salinity range to which the control system 22 is responsive which includes parallel-connected resistors 94, 96 and 98 connected in series with the probes 58 and 60 across the 6 volt AC supply. The circuit 64 still further includes a variable potentiometer 100 providing a find adjustment to establish the midpoint of the salinity range.

In the view of the foregoing description of the circuit 64, it will be appreciated that the secondary winding of the transformer 66 is connected to a voltage divider consisting of the resistance of the fluid in passage 62 across the probes 58 and 60 and the combined resistance of the range change means 92. It will be appreciated further that the voltage at terminal 102 is in accordance with the conductivity of the solution in the passage 62, and accordingly, with the degree of salinity of the solution in the passage 62. Moreover, the voltage level at point 102 may be shifted in increments by switching the resistors 96 and 98 in or out of the circuit.

A diode 104 and a filter network 106, having capacitors 108, 110, and 112 and resistor 114 connected in pi fashion as is well known in the art, is connected to terminal 102 to provide a DC potential on line 80 representative of the average level of the AC voltage at terminal 102. Therefore, the DC potential at base terminal 80 increases as the voltage at the terminal 102 increases, and hence, as the voltage drop across probes 58 and 60 decreases. Therefore, the voltage at base terminal 80 increases as the salinity of the solution in passage 62 increases. The increasing voltage on the base terminal 80 increases the forward bias of the transistor 76 so as to increase the collector to emitter current. The increased current is reflected in an increased voltage drop across the resistor 78 which is detected by the meter relay 90 (FIG. 4) connected to the terminals 86 and 88. The quiescent DC potential at the base terminal 80 may be preset by adjusting the voltage drop across the variable potentiometer 100.

Figure 5:
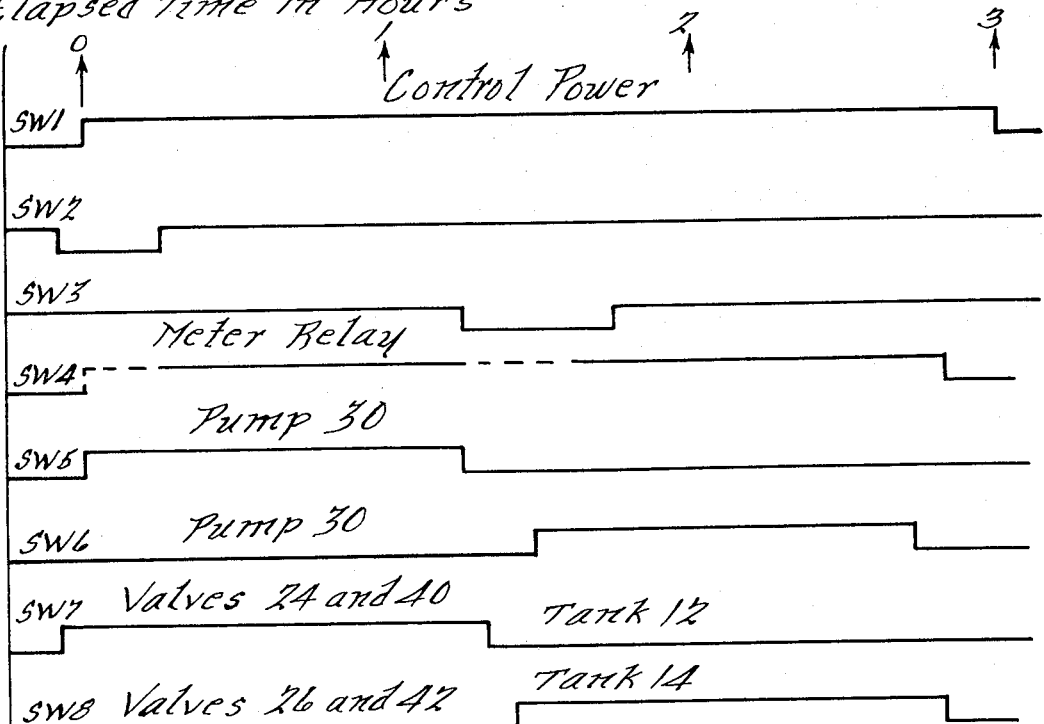
FIG. 5 is a time sequence chart of the switching functions of the switching circuitry of FIG. 4.

In FIG. 4, a sequencing circuit 116 of the control system 22 is illustrated. The sequencing circuit 116 includes a repeat cycle timer 118, which, for example, may consist of a synchronous motor driving a shaft having a plurality of cams each opening and closing an associated switch at adjustable times. Such repeat cycle timers are known in the art, and accordingly, will not be discussed in detail here. The repeat cycle timer 118 is adapted to control the operation of the system 10 so that it may sequentially adjust the salinity level in a plurality of containers using only a single source of concentrate solution and a single detecting and mixing system. The repeat cycle timer 118 and the associated switches are arranged such that the control system 10 adjusts the salinity level in both tank 12 and 14 within a three hour period. To this end, the repeat cycle timer is provided with eight cam operated switches SW1 to SW8. Switch SW1 is utilized as a main power switch; switch SW2 provided a predetermined recirculation period prior to the adjusting of the salinity level of tank 12; switch SW3 similarly provides a predetermined recirculation period prior to the adjusting of the salinity of the solution in tank 14; switch SW4 is used to prevent siphoning of the dissolver tank when the system 10 is not in operation; switches SW5 and SW6 are used to operate the pump motor during the recirculation and salinity adjustments to tanks 12 and 14, respectively; and switches SW7 and SW8 are used to operate the valves of the tanks 12 and 14, respectively. The operation of the switches will be better understood if reference is made to the timing chart of FIG. 5. Switch SW1 closes at the inception of the cycle so as to supply power to the circuit 64 and the meter relay. Just prior to the inception of the cycle, switch SW2 moves to the downward position to power the "close" coil of the motor valve 56 to assure that the valve 56 is closed to prevent the addition of concentrate to the recirculation system during an initial recirculation cycle of approximately 15 minutes. This initial recirculation period is established to assure that any stratification within the tank is eliminated. At the inception of the cycle, switch SW4 moves to the upward position so as to provide an electrical path to the meter relay 90 once switch SW2 moves to the upward position. At this time, switch SW3 is in the upward position. At the inception of the cycle, switch SW7 moves to the downward position to open the outlet valve 24 and the inlet valve 40 of tank 12, and shortly thereafter, switch SW5 moves to the downward position to operate the pump motor starter relay. Accordingly, with the operation of the pump and the opening of the valves 24 and 40, solution within the tank 12 is pumped through the recirculation system 16. After a suitable period of time to eliminate any stratification, for example, 15 minutes, switch SW2 moves to the upward position. The valve 56 will remain closed or be opened in accordance with the salinity reading at the meter relay 90. More particularly, the meter relay 90 receives voltage level signals from terminals 86 and 88, and compares the voltage level with first and second preset internal standards. A power relay is closed if the voltage level is less than the first internal standard which initiates opening of the valve 56, and consequently, provides for the introduction of concentrated salt solution to the recirculation loop at the chamber 52 thereby increasing the salinity of solution in passage 62. When the salinity of the solution in passage 62 reaches the first preset standard, the opening of the valve 56 remains constant until the salinity increases to the second preset standard, at which point, the meter relay 90 will provide a current to the "close" winding of the motor of the valve 56 so as to close the valve 56. The second standard is preset to correspond to the salinity level that it is desired to maintain in the tank 12. As the salinity of the solution again drops below the first preset level, the valve 56 will again be opened in the same manner so as to increase the salinity of the solution passing through the recirculation loop and the above cycle will repeat. It can be seen that the salinity of the solution in the recirculation loop is never allowed to exceed the desired level, the second preset point, and accordingly, the salinity of the solution in tank 12 is not allowed to exceed that level. Through this means, the salinity of the solution in tank 12 is gradually raised to the desired level without the need to estimate the total amount of concentrated solution which will be required, which, as previously explained, is difficult to estimate with any degree of accuracy because of the many variables involved. In the present example, a one hour period has been established for the measuring and concentrate addition process which period may be adjusted according to the application. At the end of the hour period, switch SW5, which operates the pump motor starter coil, and switch SW7, which operates the outlet and inlet valves 24 and 40, are closed to end the recirculation/measuring/concentrate-addition process for tank 12. Switch SW3 is also closed at this time which will provide a recirculation period for tank 14 prior to introduction of concentrated solution. After approximately 5 minutes, the outlet and inlet valves 26 and 42, respectively, of tank 14 are opened and the pump 30 is again activated to start a recirculation period to remove stratification within the second tank 14. After a 15 minute recirculation period for tank 14, the switch SW3 is moved to the upward position to allow introduction of concentrated solution into the recirculation system 16 in accordance with the settings of the meter relay 90 as explained previously with respect to tank 12.

The cycle may be repeated as often as desired, and is preferably done on a daily basis. At the end of the cycle, switch SW4 is moved to the downward position to close the valve 56 to prevent any siphoning of concentrate from the dissolver tank 20.

After storage of the cucumbers or other produce, it is often desirable to reduce the salinity level of the produce before further processing such as pickling. This can also be accomplished using a system according to the present invention by substituting the salt dissolver with a source of fresh water or other solution at a concentration level which is less than the desired concentration. The meter relay 90 is connected to open the valve to the fresh water source when the salinity is above the desired level so as to reduce the salinity of the solution. A level regulating means operatively associated with the tank or other provision must be made to discard fluid from the tank in accordance to the introduction of fresh water. It will be appreciated that the rate of decreasing the salinity level can be controlled in accordance with any pollution-control regulations regarding the disposal rate of salt.

While it will be apparent that the teachings herein are well calculated to teach one skilled in the art the method of making the preferred embodiment of this invention, it will be appreciated that the invention is susceptible to modification, variation and change without departing from the proper scope or meaning of the subjoined claims.

What is claimed is:

1. An apparatus for automatically adjusting the salinity of a solution in a container to a desired level comprising:

recirculating means associated with said container for receiving solution from said container and returning at least a portion of said solution to said container, said recirculating means including a flow line have a mixing section and a measuring section with said measuring section being spaced from and disposed downstream from said mixing section;

means associated with said recirculating means including probe means for measuring the salinity of said solution received by said recirculating means by measuring the conductivity of said solution, said probe means being disposed at said measuring section so that the conductivity is measured at a point in said recirculating means after mixing of said liquid with said solution to thereby assure that the salinity of said solution in said container does not pass said desired level, said measuring means providing an error signal having a magnitude indicative of a difference existing between said measured salinity and said desired salinity;

a source of liquid having a salinity differing from said desired level in the opposite sense as said solution; and means for introducing said liquid from said source to said solution at said mixing section of said recirculating means in response to said error signal indicative of a difference in salinity, said introducing means including proportioning valve means interposed between said source and said mixing section of said recirculating means, said valve means being responsive to the magnitude of said error signal for providing an introduction of said liquid from said source to said solution at a flow rate in accordance with said magnitude of said error signal.

2. The apparatus of claim 1 wherein said measured salinity is less than said desired salinity and wherein said source of liquid is a source of liquid having high salinity for introduction to said recirculation system to increase the salinity of said solution in said container to said desired level.

3. The apparatus of claim 1 wherein said measured salinity is more than said desired salinity and wherein said source of liquid is a source of liquid having low salinity for introduction to said recirculation system to decrease the salinity of said solution in said container to said desired level.

4. an apparatus for automatically adjusting the salinity of a solution in a plurality of containers at a desired level comprising:

recirculating means associated with said containers for receiving solution from said container and returning at least a portion of said solution to said containers, means associated with said recirculating means for measuring the salinity of said solution received by said recirculating means and providing a signal indicative of a difference existing between said measured salinity and said desired salinity;

a source of liquid having a salinity differing from said desired level in the opposite sense as said solution;

means for introducing said liquid from said source to said solution in said recirculating means in response to said signal indicative of a difference in salinity; and valve means for said recirculating means adapted to sequentially connect said recirculating means to each of said containers, said measuring means being thereby adapted to measure said salinity and said means for introducing said liquid being thereby adapted to introduce said liquid to each container during each period in which said recirculating means is connected to each of said containers.

5. The apparatus of claim 2 wherein said source is a salt dissolver comprising:

a tank;

a bed of salt in said tank; and means providing liquid to said tank for dissolving said salt to raise the salinity of said liquid, said tank being adapted for introduction of said higher salinity liquid to said recirculating means in response to said signal indicative of the existence of a difference in salinity.

6. The apparatus of claim 5 wherein said salt dissolver tank has:

an inlet receiving fluid from said recirculation system and an outlet connected to said recirculation system at said point for introducing said liquid, and means controlling the fluid received at said inlet for maintaining the level of solution in said tank substantially constant thereby replenishing liquid in said salt dissolver tank in substantially the same quantity as the liquid delivered to the recirculation system to maintain the solution in said container and recirculation system substantially constant.

7. The apparatus of claim 1 further including relay meter means which is adapted to be set to a desired salinity reading and is operatively connected to said means associated with said probe means to receive the signal therefrom, said meter relay being adapted for comparing said setting and said signal to provide said error signal indicative of the existence of a difference in salinity when said setting differs from said signal.

8. The apparatus of claim 7 wherein said valve means is operated by said meter relay output signal so as to open said valve in response to said error signal indicative of the existence of a difference in salinity.

9. The apparatus of claim 8 wherein said measured salinity is less than said desired salinity and wherein said source of liquid is a source of liquid having high salinity for introduction to said recirculation system to increase the salinity of said solution in said container to said desired level.

10. The apparatus of claim 8 wherein said measured salinity is more than said desired salinity and wherein said source of liquid is a source of liquid having low salinity for introduction to said recirculation system to decrease the salinity of said solution in said container to said desired level.

11. An apparatus for automatically adjusting the solute concentration of a solution in a container to a desired level comprising:

recirculating means associated with said container for receiving solution from said container and returning at least a portion of said solution to said container, said recirculating means including a flow line having a mixing section and a measuring section with said measuring section being spaced from and disposed downstream from said mixing section; means associated with said recirculating means including probe means for measuring the solute concentration of said solution, said probe means being disposed at said measuring section so that the concentration of said solution is measured at a point in said recirculating means after mixing of said liquid with said solution to thereby assure that the concentration of said solution in said container does not pass said desired level, said measuring means providing an error signal having a magnitude indicative of a difference existing between said measured solute concentration and said desired solute concentration;

a source of liquid having a solute concentration differing from said desired solute concentration in the opposite sense as the solution; and means for introducing said liquid from said source to said solution at said mixing section of said recirculating means in response to said error signal indicative of a difference in solute concentration, said introducing means including proportioning valve means interposed between said source and said mixing section of said recirculating means, said valve means being responsive to the magnitude of said error signal for providing an introduction of said liquid from said source to said solution at a flow rate in accordance with said magnitude of said error signal.

12. The apparatus of claim 11 wherein said measured solute concentration is less than said desired level and said source of liquid is a source of liquid having a high solute concentration for introduction to said recirculation system to increase the solute concentration of said solution in said container to said desired level.

13. The apparatus of claim 11 wherein said measured solute concentration is more than said desired level and wherein said source of liquid is a source of liquid having a low solute concentration for introduction to said recirculation system to decrease the solute concentration of said liquid in said container to said desired level.

* * * * *